United States Patent [19]
Horiuchi et al.

[11] Patent Number: 4,988,174
[45] Date of Patent: Jan. 29, 1991

[54] ZOOM LENS

[75] Inventors: Akihisa Horiuchi, Tokyo; Hiroyuki Hamano, Kanagawa, both of Japan

[73] Assignee: Canon Kabushiki Kaisha, Tokyo, Japan

[21] Appl. No.: 355,348

[22] Filed: May 23, 1989

[30] Foreign Application Priority Data

May 31, 1988 [JP] Japan .................. 63-134129

[51] Int. Cl.$^5$ ............................................. G02B 15/14
[52] U.S. Cl. ............................................. 350/427
[58] Field of Search ............................... 350/423, 427

[56] References Cited

U.S. PATENT DOCUMENTS

| | | | |
|---|---|---|---|
| 4,621,905 | 11/1986 | Kato et al. | 350/427 |
| 4,770,510 | 9/1988 | Mukaiya | 350/427 |
| 4,812,024 | 3/1989 | Mukaiya | 350/427 |
| 4,832,471 | 5/1989 | Hamano | 350/427 |
| 4,846,563 | 7/1989 | Mukaiya | 350/427 |

Primary Examiner—Scott J. Sugarman
Attorney, Agent, or Firm—Fitzpatrick, Cella, Harper & Scinto

[57] ABSTRACT

A zoom lens comprises, from an object side to an image plane side, a positive first lens unit for focusing, a negative second lens unit as the variator, a negative third lens unit as the compensator, a positive fourth lens unit for producing an almost diverging light beam, and an image forming fifth lens unit. The fifth lens unit includes a bi-convex first lens, a negative second lens having a concave surface facing the object side, a bi-convex third lens having a strong refracting surface facing the object side, a negative fourth lens having a concave surface facing the image plane side, a bi-convex fifth lens having a strong refracting surface facing the image plane side, and a bi-convex sixth lens having a strong refracting surface facing the object side. The zoom lens satisfies the following conditions:

$$1.05 < f4/L < 1.3$$

$$20.4 < |R5,4/fw| < 30.6$$

$$0 < fw/R5,7 < 0.076$$

$$1.58 < (N5,1 + N5,3 + N5,5 + N5,6)/4 < 1.86$$

where L is a distance from the convergent point of an on-axial light beam having passed through the first to third units to a front principal point of the fourth lens unit, f4 is a focal length of the fourth lens unit, N5,i is a refractive index of a medium of the i-th lens in the fifth lens unit, R5,i is a radius of curvature of the i-th lens surface in the fifth lens unit, and fw is the shortest focal length of the entire lens system.

2 Claims, 7 Drawing Sheets

ZOOM LENS

BACKGROUND OF THE INVENTION

1. Field of the Invention

This invention relates to zoom lenses and, more particularly, to zoom lenses of large relative aperture, while still having good optical performance over the entire zooming range, suited to photographic cameras or video cameras.

2. Description of the Related Art

In photographic cameras or video cameras, there has been demand for zoom lenses of large relative aperture and high range with high optical performance.

Of these, the video camera, because its image sensor is relatively low in sensitivity, requires that the relative aperture of the zoom lens is as large as possible.

Beside this, in the case of the color video camera using the stripe filter in front of the single-tube type color image sensing tube or the image sensing plate such as CCD, for the purpose of preventing color mixture, it is required that the whole optical system be constructed in telecentric form so that all rays of light which are to enter the stripe filter become as normal thereto as possible.

Further, as the CCD, MOS or like image sensors are widely used at present in the video cameras, the surface of its cover glass and the surface of that image sensor generally have high reflectances. The light reflected from these surfaces, therefore, reflects from the lens surfaces of the photographic lens and the inside of the lens barrel and enters again the image sensor thus becoming a cause of producing the so-called ghost or flare.

In this regard, a technique of reducing that ghost and flare that arises from the reflection from the image sensor by specifying the lens surfaces of the relay lens unit under a certain condition is proposed in Japanese Laid-Open patent application No. Sho 57-147612 and U.S. patent application Ser. No. 223,108 filed on July 22, 1988.

By the way, the video camera, etc. is included also with the diaphragm and a filter member such as ND filter located usually in that space of the photographic lens which forms an afocal optical system. The reflected light from this filter enters again the image sensor, forming a ghost image thereon. A technique of preventing this from occurring is proposed in U.S. patent application Ser. No. 301,951 filed on Jan. 26, 1989 now U.S. Pat. No. 4,892,397.

Meanwhile, as for the zoom lenses suited to the video cameras, mention may be made of those disclosed in U.S. Pat. Nos. 4,618,219, 4,621,905, 4,659,187, 4,653,874 and 4,518,228, Japanese Laid-Open patent application No. Sho 59-222807, Japanese Laid-Open patent application No. Sho 60-260912 and Japanese Laid-Open patent application No. Sho 61-20291, and U.S. Pat. No. 4,812,024.

SUMMARY OF THE INVENTION

An object of the present invention is to provide a zoom lens of small size, though its aperture ratio being greatly increased, well corrected for high optical performance over the entire range of variation of the image magnification, in which when the ND filter or the like is positioned near the diaphragm, ghost, flare, etc. is not produced by the reflected light from this filter.

BRIEF DESCRIPTION OF THE DRAWINGS

FIGS. 2(A), 3(A), 4(A) and 5(A) are at the wide-angle end, FIGS. 2(B), 3(B), 4(B) and 5(B) are in the middle position, and FIGS. 2(C), 3(C), 4(C) and 5(C) are at the telephoto end.

DETAILED DESCRIPTION OF THE PREFERRED EMBODIMENTS

Figure 1:
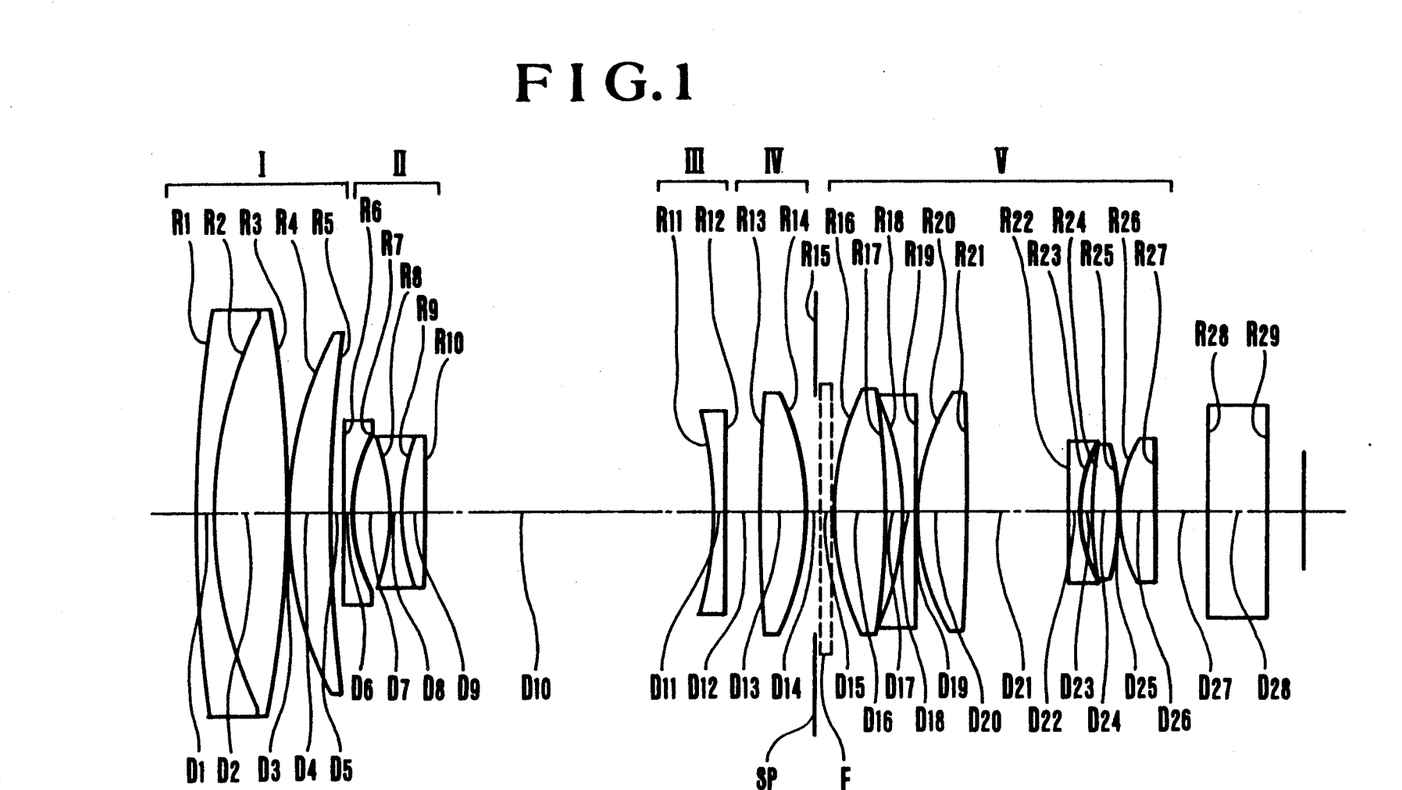
FIG. 1 is a longitudinal section view of a numerical example 1 of a zoom lens of the invention.
Figure 2A:
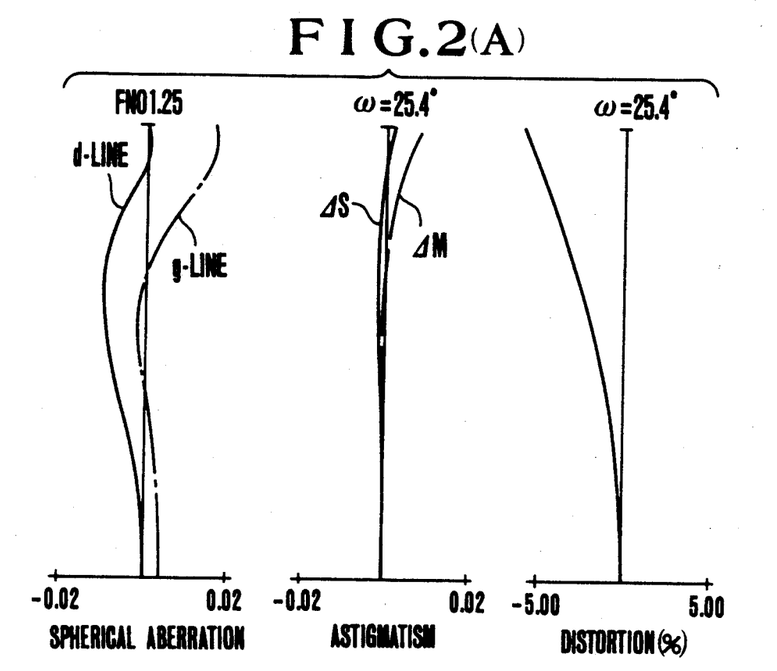
FIGS. 2(A), 2(B) and 2(C), 3(A), 3(B) and 3(C), 4(A), 4(B) and 4(C), and 5(A), 5(B) and 5(C) are graphic representations of all aberrations of the numerical examples 1 to 4 of the invention respectively. In the aberration curves.
Figure 2B:
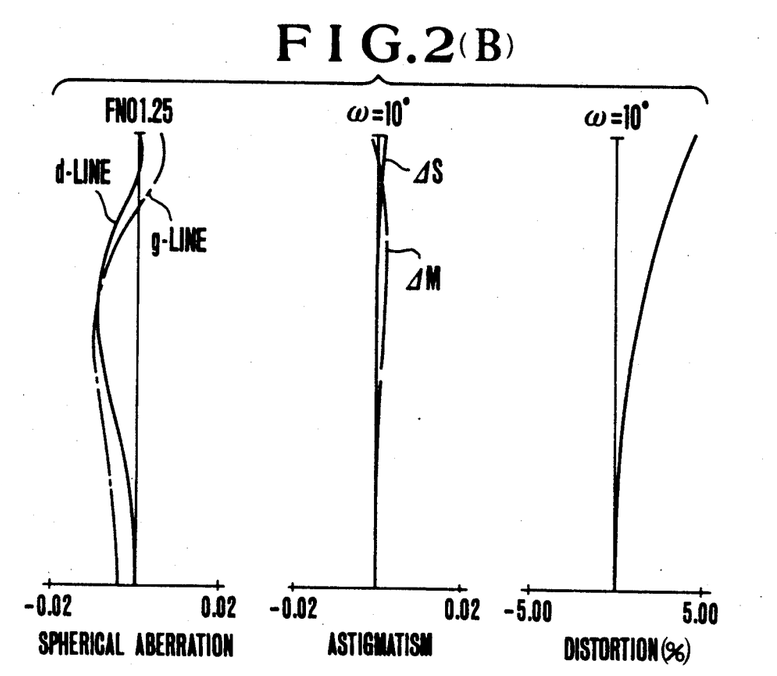
Figure 2C:
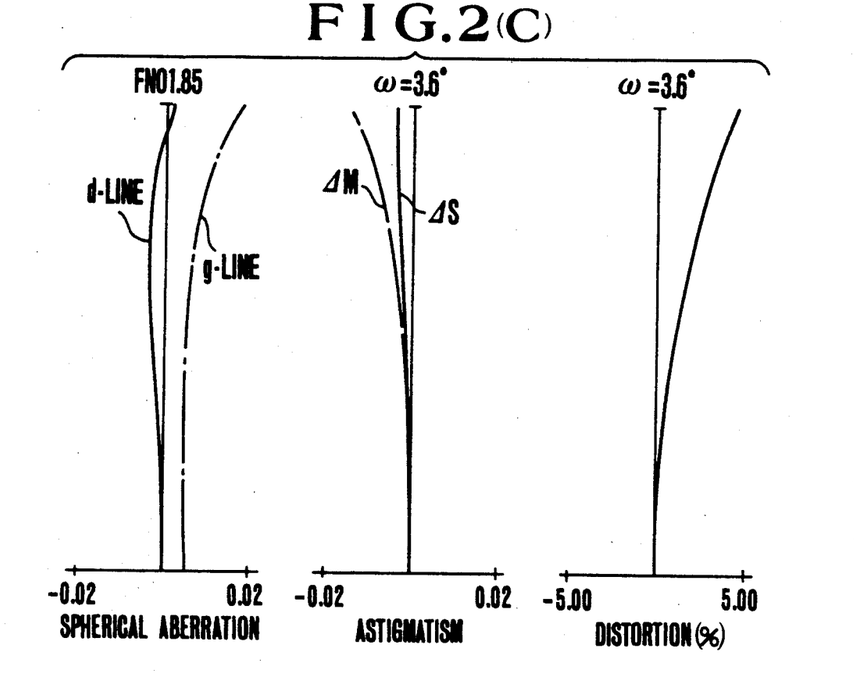

FIG. 1 shows a numerical example 1 of the invention. In the figure, I is a first lens unit of positive refractive power for focusing; II is a second lens unit of negative refractive power monotonously movable for variation of the image magnification; III is a third lens unit which moves, while depicting a locus convex toward the object side, to compensate for the shift of an image plane resulting from the variation of the image magnification; IV is a fourth lens unit of positive refractive power receptive of the light beam from the third lens unit for producing an almost diverging light beam; F is an ND filter used, for example, when an object to be photographed is too bright; V is a fixed fifth lens unit having an image forming function; SP is a fixed stop. Further, the fifth lens unit includes a first lens of which both lens surfaces are convex, a negative second lens having a concave surface facing the object side, a positive third lens which has a strong refracting surface facing the object side and of which both lens surfaces are convex, a negative fourth lens having a concave surface facing the image plane side, a fifth lens which has a strong refracting surface facing the image plane side and of which both lens surfaces are convex, and a positive sixth lens which has a strong refracting surface facing the object side and of which both lens surfaces are convex. The zoom lens satisfies the following conditions:

$$1.05 < f_4/L < 1.3 \quad (1)$$

$$20.4 < |R_{5,4}/f_w| < 30.6 \quad (2)$$

$$0 < f_w/R_{5,7} < 0.076 \quad (3)$$

$$1.58 < (N_{5,1} + N_{5,3} + N_{5,5} + N_{5,6})/4 < 1.85 \quad (4)$$

where L is a distance from a convergent point of an on-axial light beam having passed through the first to third lens units to a front principal point of the fourth lens unit, f4 is a focal length of the fourth lens unit, N5,i is a refractive index of a medium of the i-th lens in the fifth lens unit, R5,i is a radius of curvature of the i-th lens surface in the fifth lens unit, and fw is the shortest focal length of the entire lens system.

By specifying the form and construction and arrangement of the elements of the fifth lens unit as above, the aberrations arising from the increase of the aperture ratio and the extension of the zooming range are corrected well for high grade of imagery over the entire zooming range.

Particularly, the residual aberrations of the zoom section, for example, spherical and comatic ones, are corrected in good balance while the total length of the entire lens system is shortened.

Further, by specifying the refractive power of the fourth lens unit as the inequalities of condition (1), in other words, by making the emerging light from the fourth lens unit to tend to slightly diverge, it is effectively prevented that when the ND filter is positioned near the stop, the reflected light from the surface of the image sensor reflects from the surface of this filter and enters again the image sensor so that ghost or flare appears on its surface.

When the lower limit of the inequalities of condition (1) is exceeded, the light beam becomes nearly parallel, so that it gets harder to effectively remove the ghost or flare. When the upper limit is exceeded, the light beam is caused to be too divergent and the range of variation of aberrations with zooming is increased objectionably.

The inequalities of conditions (2) to (4) concern with a way in which the fifth lens unit of the present embodiment is designed to effectively prevent the ghost and flare due to the reflected light from the surface of the image sensor.

The inequalities of condition (2) concern with the radius of curvature of the fourth lens surface counting from the object side in the fifth lens unit to accomplish an aim of decreasing mainly the coma produced and another aim that as harmful light which will lead to ghost or flare arises from the reflection between the image sensor and the fourth lens surface, the position at which the reflected light from the fourth lens surface re-focuses is brought away toward the photographic lens. When the curvature becomes small beyond the lower limit, inward coma is produced, which is difficult to correct by the design of any other lens surfaces. When the curvature becomes large beyond the upper limit, the re-focusing position of the light due to the reflection between the image sensor and the fourth lens surface falls near or at the image receiving surface of the image sensor or at a farther point than the image receiving surface from the photographic lens. Thus, the that reflection gives rise to harmful light.

The condition (3) is similar to the condition (2) in that the re-focusing position of the light arising from the reflection between the image sensor and the aforesaid lens surface is brought toward the photographic lens but different in that field curvature and coma are corrected in good balance. When the curvature becomes small beyond the upper limit, large outward coma is produced. When the curvature becomes large beyond the lower limit, under-correction of field curvature results. Hence, it is no good.

The inequalities of condition (4) concern with the mean refractive index of the media of the four positive lenses in the fifth lens unit and aim that within the range of the inequalities of conditions (2) and (3) the spherical aberration and coma produced are lessened, and good correction of field curvature is maintained. When the mean refractive index of the media of the positive lenses becomes small beyond the lower limit, the Petzval sum is increased in the positive direction objectionably, so that under-correction of field curvature results. Meanwhile, when the mean refractive index becomes large beyond the upper limit, over-correction of field curvature results.

To achieve a further improvement of the optical performance throughout the zooming range, for the design of the fifth lens unit, the present embodiment sets forth the following conditions:

$$-1.35 < R5,1/R5,3 < -1.03 \quad (5)$$

$$2.14 < R5,5/fw < 2.47 \quad (6)$$

$$1.28 < R5,8/fw < 1.53 \quad (7)$$

$$1.96 < R5,9/R5,11 < 4.76 \quad (8)$$

$$0.13 < D5,2/fw < 0.20 \quad (9)$$

$$1.02 < D5,6/fw < 0.24 \quad (10)$$

$$0.10 < D5,8/fw < 0.17 \quad (11)$$

where $D5,i$ is the i-th axial thickness or air separation counting from the object side in the fifth lens unit.

The inequalities of condition (5) concern with the ratio of the radius of curvature of the first lens surface counting from the object side to the radius of curvature of the third lens surface in the fifth lens unit and aim to properly correct mainly spherical aberration. When the lower limit is exceeded, under-correction of spherical aberration results. When the upper limit is exceeded, it becomes over-corrected.

The inequalities of condition (6) aim to effectively converge the light beam without producing spherical aberration as far as possible. When the lower limit is exceeded, very large spherical aberration is produced. When the upper limit is exceeded, the converging effect becomes insufficient, causing the total length of the lens system to increase objectionably.

The inequalities of condition (7) aim to construct the entire lens system in compact form without causing coma to produce as far as possible, while simultaneously permitting the optical system of the telecentric type to be well corrected. When the lower limit is exceeded, very large coma is produced, which is difficult to correct. When the optical system is made more telecentric than the upper limit, the total length of the lens system is increased objectionably.

The inequalities of condition (8) aim to correct field curvature and coma in good balance. When the lower limit is exceeded, under-correction of field curvature results. Further, large inward coma is produced. When the upper limit is exceeded, the field curvature becomes over-corrected. Further, large outward coma is produced, which is difficult to correct.

The inequalities of condition (9) aim to correct mainly spherical aberration and astigmatism in good balance. When the lower limit is exceeded, the astigmatism increases. When the upper limit exceeds, higher order spherical aberrations are produced The inequalities of condition (10) concern with the spacing between the third lens and fourth lens in the fifth lens unit, and aim to correct on-axis aberrations and off-axis aberrations in good balance and to achieve realization of the telecentric optical system. When the lower limit is exceeded, the off-axial aberrations such as astigmatism and coma deteriorate, and it gets harder to construct the optical system in telecentric form. When the upper limit is exceeded, the on-axial aberrations such as spherical aberration are produced.

The inequalities of condition (11) aim to correct mainly coma and distortion. When the lower limit is exceeded, outward coma is produced, which is difficult to correct well. When the upper limit is exceeded, the barrel-type distortion is increased objectionably in the wide-angle end.

Four numerical examples 1 to 4 of specific zoom lenses of the invention are shown in the following tables below for the radii of curvature, R, the axial thicknesses or air separations, D, and the refractive indices, N, and Abbe numbers, ν, of the glasses of the lens elements with subscripts numbered consecutively from the object side to the image plane side. R28 and R29 define a face place or filter.

Further, the values of the factors in the above-described conditions (1) to (11) for the numerical examples 1 to 4 are listed in Table-1.

In FIG. 1 to FIG. 5(C), I, II, III, IV and V denote the first, second, third, fourth and fifth lens units, respectively; ΔM is the meridional image surface; ΔS is the sagittal image surface; d is the d-line, g is the g-line, and SP is the stop.

Numerical Example 1 (FIGS. 1, 2(A), 2(B) and 2(C)):
F = 1-7.6    FNo = 1:1.2-1.8    2ω = 50.8°-7.1°

| | | | | | | |
|---|---|---|---|---|---|---|
| R1 = | 14.100 | D1 = | 0.21 | N1 = 1.80518 | ν1 = | 25.4 |
| R2 = | 4.869 | D2 = | 0.79 | N2 = 1.60311 | ν2 = | 60.7 |
| R3 = | −11.992 | D3 = | 0.02 | | | |
| R4 = | 3.964 | D4 = | 0.45 | N3 = 1.69680 | ν3 = | 55.5 |
| R5 = | 10.483 | D5 = | Variable | | | |
| R6 = | 20.812 | D6 = | 0.11 | N4 = 1.77250 | ν4 = | 49.6 |
| R7 = | 1.637 | D7 = | 0.44 | | | |
| R8 = | −2.010 | D8 = | 0.10 | N5 = 1.69680 | ν5 = | 55.5 |
| R9 = | 2.010 | D9 = | 0.29 | N6 = 1.84666 | ν6 = | 23.9 |
| R10 = | −61.022 | D10 = | Variable | | | |
| R11 = | −3.437 | D11 = | 0.12 | N7 = 1.69680 | ν7 = | 55.5 |
| R12 = | −30.932 | D12 = | Variable | | | |
| R13 = | 14.757 | D13 = | 0.51 | N8 = 1.60311 | ν8 = | 60.7 |
| R14 = | −2.751 | D14 = | 0.11 | | | |
| R15 = | Stop | D15 = | 0.22 | | | |
| R16 = | 3.135 | D16 = | 0.58 | N9 = 1.63854 | ν9 = | 55.4 |
| R17 = | −6.674 | D17 = | 0.18 | | | |
| R18 = | −2.863 | D18 = | 0.15 | N10 = 1.80518 | ν10 = | 25.4 |
| R19 = | 21.463 | D19 = | 0.02 | | | |
| R20 = | 2.267 | D20 = | 0.59 | N11 = 1.65844 | ν11 = | 50.9 |
| R21 = | −20.198 | D21 = | 1.09 | | | |
| R22 = | 86.919 | D22 = | 0.09 | N12 = 1.83400 | ν12 = | 37.2 |
| R23 = | 1.367 | D23 = | 0.15 | | | |
| R24 = | 4.744 | D24 = | 0.30 | N13 = 1.51633 | ν13 = | 64.1 |
| R25 = | −2.775 | D25 = | 0.02 | | | |
| R26 = | 1.553 | D26 = | 0.38 | N14 = 1.62299 | ν14 = | 58.2 |
| R27 = | 48.438 | D27 = | 0.56 | | | |
| R28 = | ∞ | D28 = | 0.67 | N15 = 1.51633 | ν15 = | 64.1 |
| R29 = | ∞ | | | | | |

| | | | |
|---|---|---|---|
| f | 1.00 | 2.70 | 7.60 |
| D5 | 0.16 | 2.10 | 3.21 |
| D10 | 3.25 | 0.78 | 0.45 |
| D12 | 0.37 | 0.90 | 0.12 |

Figure 3A:
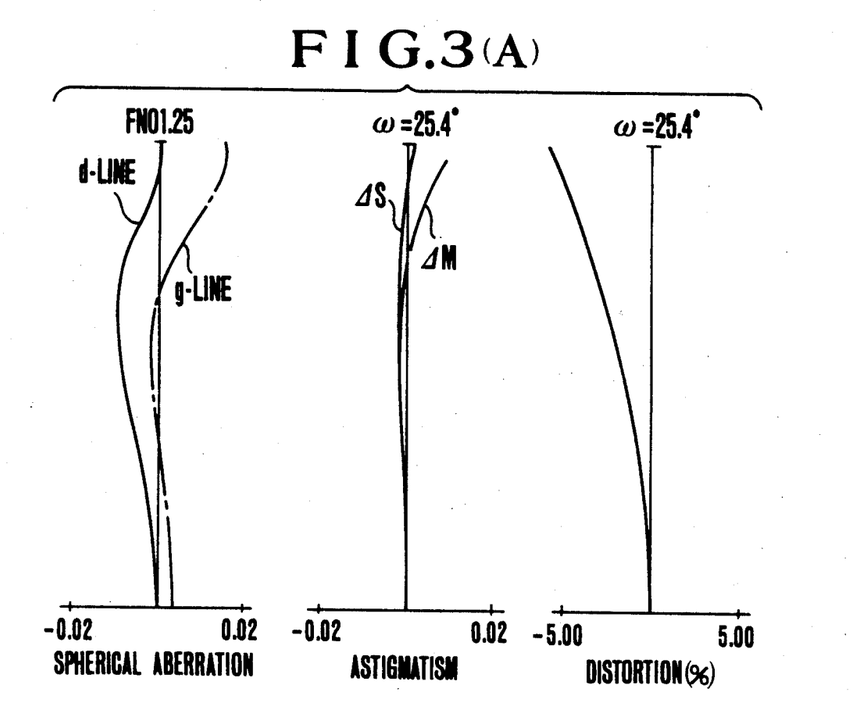
Figure 3B:
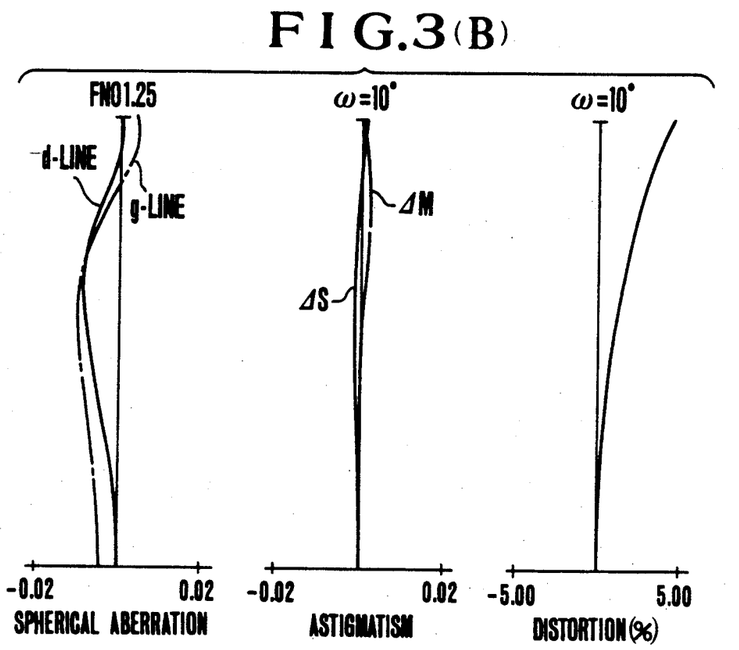
Figure 3C:
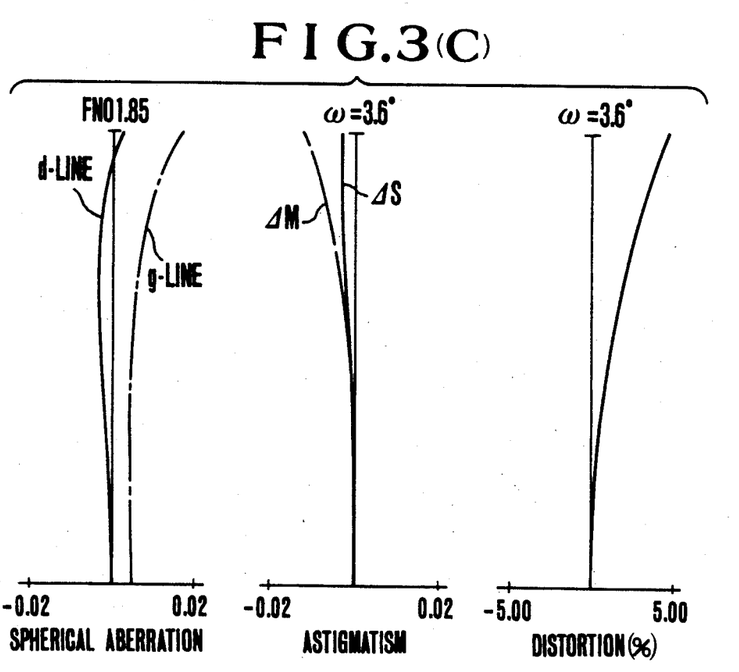

Numerical Example 2 (FIGS. 3(A), 3(B) and 3(C)):
F = 1-7.6    FNo = 1:1.2-1.8    2ω = 50.8°-7.1°

| | | | | | | |
|---|---|---|---|---|---|---|
| R1 = | 14.100 | D1 = | 0.21 | N1 = 1.80518 | ν1 = | 25.4 |
| R2 = | 4.869 | D2 = | 0.79 | N2 = 1.60311 | ν2 = | 60.7 |
| R3 = | −11.992 | D3 = | 0.02 | | | |
| R4 = | 3.964 | D4 = | 0.45 | N3 = 1.69680 | ν3 = | 55.5 |
| R5 = | 10.483 | D5 = | Variable | | | |
| R6 = | 20.812 | D6 = | 0.11 | N4 = 1.77250 | ν4 = | 49.6 |
| R7 = | 1.637 | D7 = | 0.44 | | | |
| R8 = | −2.010 | D8 = | 0.10 | N5 = 1.69680 | ν5 = | 55.5 |
| R9 = | 2.010 | D9 = | 0.29 | N6 = 1.84666 | ν6 = | 23.9 |
| R10 = | −61.022 | D10 = | Variable | | | |
| R11 = | −3.437 | D11 = | 0.12 | N7 = 1.69680 | ν7 = | 55.5 |
| R12 = | −30.932 | D12 = | Variable | | | |
| R13 = | 14.757 | D13 = | 0.51 | N8 = 1.60311 | ν8 = | 60.7 |
| R14 = | −2.751 | D14 = | 0.11 | | | |
| R15 = | Stop | D15 = | 0.22 | | | |
| R16 = | 3.166 | D16 = | 0.57 | N9 = 1.63854 | ν9 = | 55.4 |
| R17 = | −6.885 | D17 = | 0.19 | | | |
| R18 = | −2.896 | D18 = | 0.15 | N10 = 1.80518 | ν10 = | 25.4 |
| R19 = | 22.174 | D19 = | 0.02 | | | |
| R20 = | 2.304 | D20 = | 0.58 | N11 = 1.65844 | ν11 = | 50.9 |
| R21 = | −23.260 | D21 = | 1.13 | | | |
| R22 = | 16.451 | D22 = | 0.09 | N12 = 1.83400 | ν12 = | 37.2 |
| R23 = | 1.346 | D23 = | 0.14 | | | |
| R24 = | 3.770 | D24 = | 0.29 | N13 = 1.51633 | ν13 = | 64.1 |
| R25 = | −3.378 | D25 = | 0.02 | | | |
| R26 = | 1.564 | D26 = | 0.38 | N14 = 1.62299 | ν14 = | 58.2 |
| R27 = | 34.600 | D27 = | 0.56 | | | |
| R28 = | ∞ | D28 = | 0.67 | N15 = 1.51633 | ν15 = | 64.1 |
| R29 = | ∞ | | | | | |

Numerical Example 2 (FIGS. 3(A), 3(B) and 3(C)):
F = 1–7.6   FNo = 1:1.2–1.8   2ω = 50.8°–7.1°

| f | 1.00 | 2.70 | 7.60 |
|---|---|---|---|
| D5 | 0.16 | 2.10 | 3.21 |
| D10 | 3.25 | 0.78 | 0.45 |
| D12 | 0.37 | 0.90 | 0.12 |

Figure 4A:
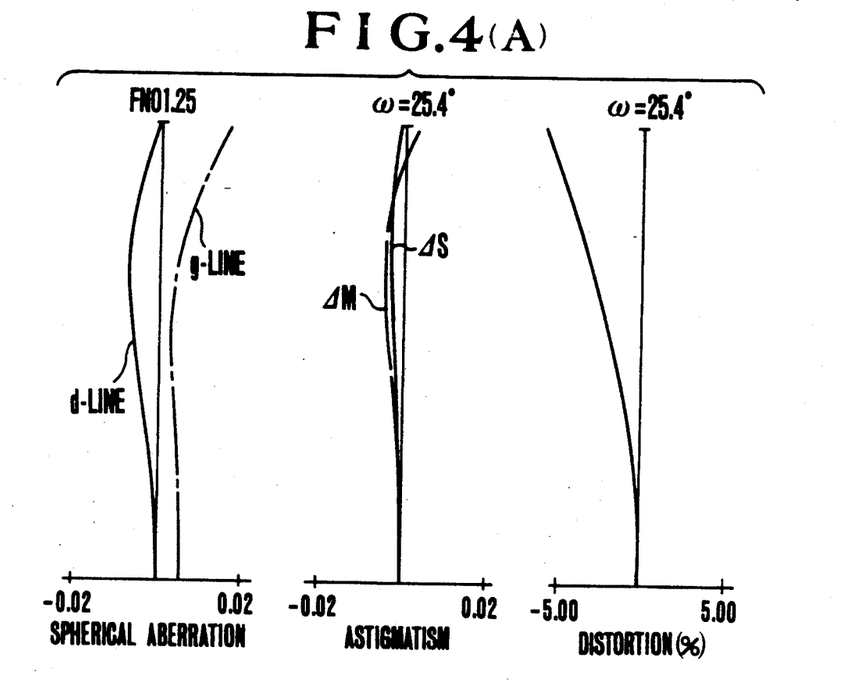
Figure 4B:
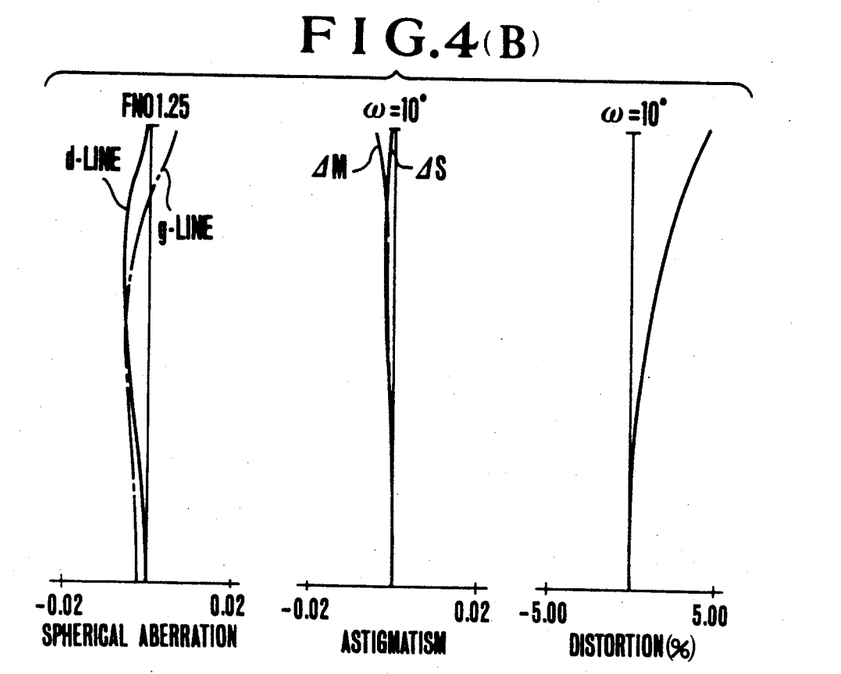
Figure 4C:
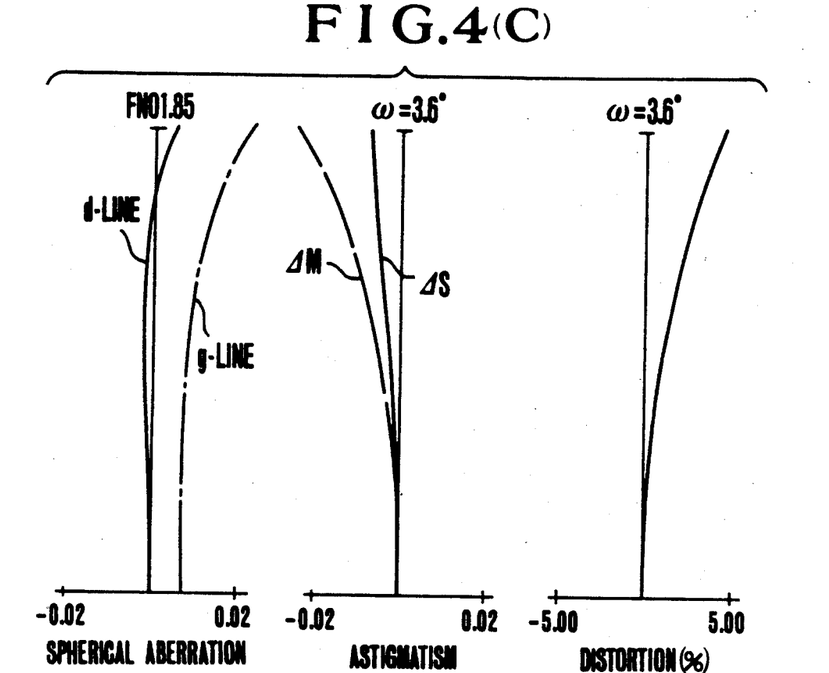

Numerical Example 3 (FIGS. 4(A), 4(B) and 4(C)):
F = 1–7.6   FNo = 1:1.2–1.8   2ω = 50.8°–7.1°

| | | | | |
|---|---|---|---|---|
| R1 = 14.100 | D1 = 0.21 | N1 = 1.80518 | ν1 = 25.4 |
| R2 = 4.869 | D2 = 0.79 | N2 = 1.60311 | ν2 = 60.7 |
| R3 = −11.992 | D3 = 0.02 | | |
| R4 = 3.964 | D4 = 0.45 | N3 = 1.69680 | ν3 = 55.5 |
| R5 = 10.483 | D5 = Variable | | |
| R6 = 20.812 | D6 = 0.11 | N4 = 1.77250 | ν4 = 49.6 |
| R7 = 1.637 | D7 = 0.44 | | |
| R8 = −2.010 | D8 = 0.10 | N5 = 1.69680 | ν5 = 55.5 |
| R9 = 2.010 | D9 = 0.29 | N6 = 1.84666 | ν6 = 23.9 |
| R10 = −61.022 | D10 = Variable | | |
| R11 = −3.437 | D11 = 0.12 | N7 = 1.69680 | ν7 = 55.5 |
| R12 = −30.932 | D12 = Variable | | |
| R13 = 14.757 | D13 = 0.51 | N8 = 1.60311 | ν8 = 60.7 |
| R14 = −2.751 | D14 = 0.11 | | |
| R15 = Stop | D15 = 0.22 | | |
| R16 = 3.265 | D16 = 0.46 | N9 = 1.63854 | ν9 = 55.4 |
| R17 = −7.092 | D17 = 0.14 | | |
| R18 = −2.909 | D18 = 0.13 | N10 = 1.80518 | ν10 = 25.4 |
| R19 = 28.191 | D19 = 0.02 | | |
| R20 = 2.328 | D20 = 0.46 | N11 = 1.65844 | ν11 = 50.9 |
| R21 = −28.203 | D21 = 1.18 | | |
| R22 = 15.118 | D22 = 0.09 | N12 = 1.83400 | ν12 = 37.2 |
| R23 = 1.421 | D23 = 0.11 | | |
| R24 = 3.649 | D24 = 0.26 | N13 = 1.51633 | ν13 = 64.1 |
| R25 = −3.649 | D25 = 0.02 | | |
| R26 = 1.761 | D26 = 0.30 | N14 = 1.62299 | ν14 = 58.2 |
| R27 = ∞ | D27 = 0.56 | | |
| R28 = ∞ | D28 = 0.67 | N15 = 1.51633 | ν15 = 64.1 |
| R29 = ∞ | | | |

| f | 1.00 | 2.70 | 7.60 |
|---|---|---|---|
| D5 | 0.16 | 2.10 | 3.21 |
| D10 | 3.25 | 0.78 | 0.45 |
| D12 | 0.37 | 0.90 | 0.12 |

Figure 5A:
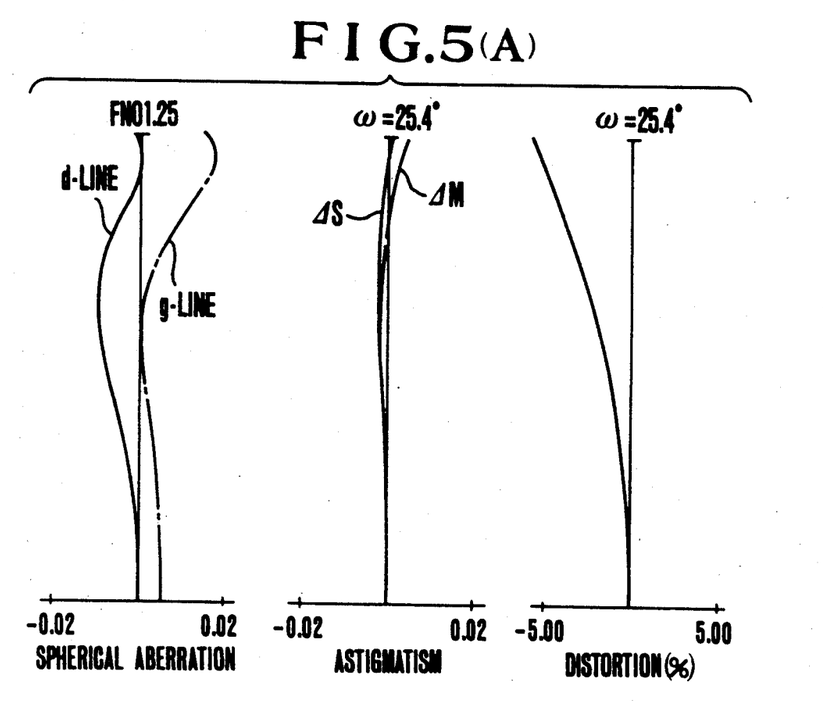
Figure 5B:
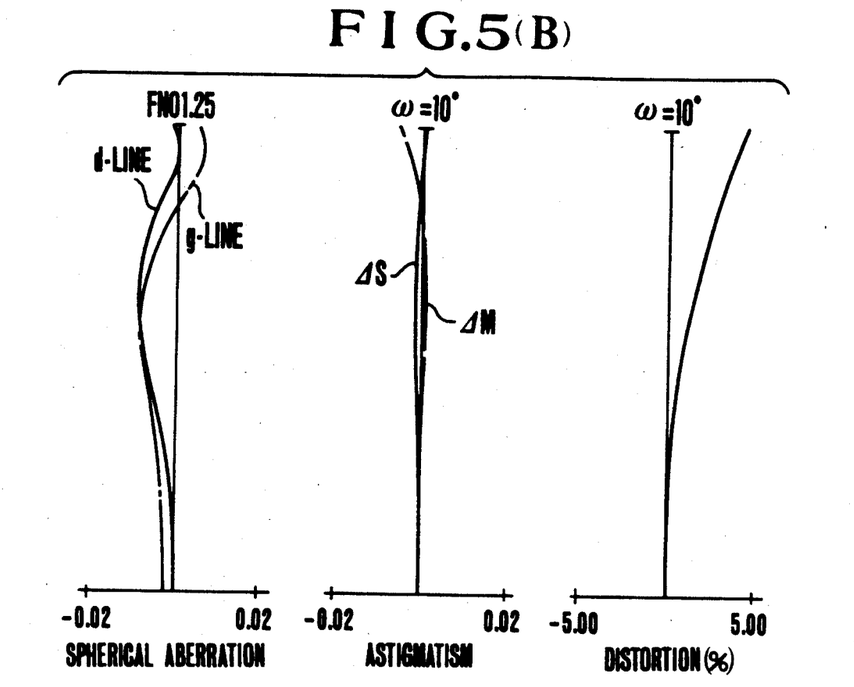
Figure 5C:
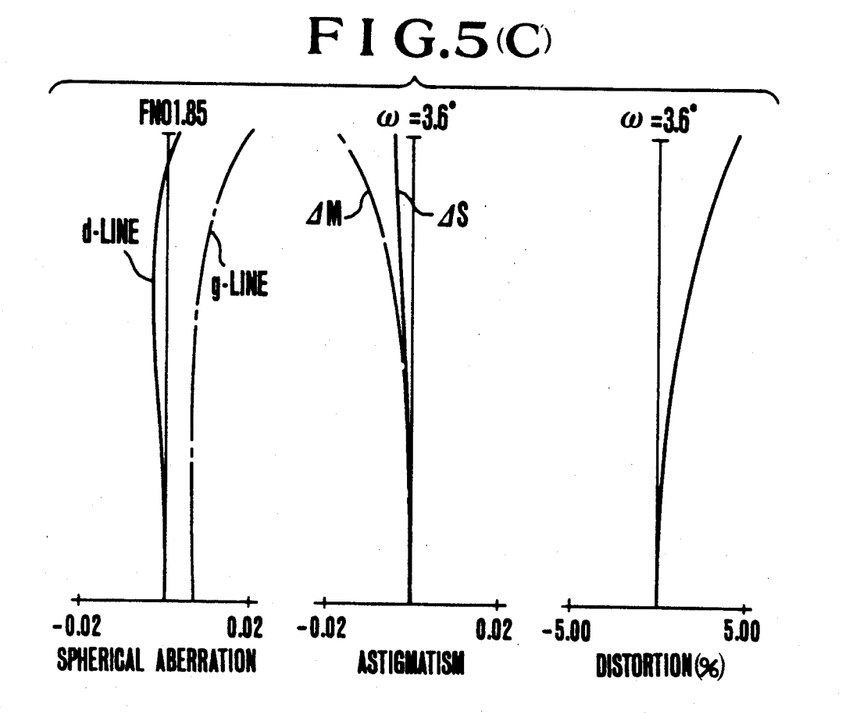

Numerical Example 4 (FIGS. 5(A), 5(B) and 5(C)):
F = 1–7.6   FNo = 1:1.2–1.8   2ω = 50.8°–7.1°

| | | | |
|---|---|---|---|
| R1 = 14.103 | D1 = 0.212 | N1 = 1.80518 | ν1 = 25.4 |
| R2 = 4.870 | D2 = 0.793 | N2 = 1.60311 | ν2 = 60.7 |
| R3 = −11.995 | D3 = 0.022 | | |
| R4 = 3.965 | D4 = 0.446 | N3 = 1.69680 | ν3 = 55.5 |
| R5 = 10.485 | D5 = Variable | | |
| R6 = 20.817 | D6 = 0.111 | N4 = 1.77250 | ν4 = 49.6 |
| R7 = 1.637 | D7 = 0.435 | | |
| R8 = −2.010 | D8 = 0.100 | N5 = 1.69680 | ν5 = 55.5 |
| R9 = 2.010 | D9 = 0.290 | N6 = 1.84666 | ν6 = 23.9 |
| R10 = −61.036 | D10 = Variable | | |
| R11 = −3.438 | D11 = 0.122 | N7 = 1.69680 | ν7 = 55.5 |
| R12 = −30.938 | D12 = Variable | | |
| R13 = 14.760 | D13 = 0.513 | N8 = 1.60311 | ν8 = 60.7 |
| R14 = −2.751 | D14 = 0.11 | | |
| R15 = Stop | D15 = 0.277 | | |
| R16 = 3.449 | D16 = 0.625 | N9 = 1.63854 | ν9 = 55.4 |
| R17 = −5.593 | D17 = 0.177 | | |
| R18 = −2.699 | D18 = 0.145 | N10 = 1.80518 | ν10 = 25.4 |
| R19 = 29.093 | D19 = 0.016 | | |
| R20 = 2.353 | D20 = 0.614 | N11 = 1.65844 | ν11 = 50.9 |
| R21 = −14.644 | D21 = 1.139 | | |
| R22 = −64.707 | D22 = 0.089 | N12 = 1.83400 | ν12 = 37.2 |
| R23 = 1.453 | D23 = 0.162 | | |
| R24 = 7.167 | D24 = 0.312 | N13 = 1.51633 | ν13 = 64.1 |
| R25 = −2.400 | D25 = 0.016 | | |
| R26 = 1.583 | D26 = 0.402 | N14 = 1.62299 | ν14 = 58.2 |
| R27 = 206.428 | D27 = 0.558 | | |
| R28 = ∞ | D28 = 0.446 | N15 = 1.51633 | ν15 64.1 |
| R29 = ∞ | | | |

-continued

Numerical Example 4 (FIGS. 5(A), 5(B) and 5(C)):
F = 1-7.6   FNo = 1:1.2-1.8   2ω = 50.8°-7.1°

|     |      |      |      |
| --- | ---- | ---- | ---- |
| f   | 1.00 | 2.70 | 7.60 |
| D5  | 0.16 | 2.10 | 3.21 |
| D10 | 3.25 | 0.78 | 0.45 |
| D12 | 0.37 | 0.90 | 0.12 |

TABLE 1

| Conditions | Numerical Examples | | | |
| --- | --- | --- | --- | --- |
|  | 1 | 2 | 3 | 4 |
| (1) f4/L | 1.10 | 1.10 | 1.10 | 1.10 |
| (2) \|R5,4/fw\| | 21.5 | 22.2 | 28.2 | 29.1 |
| (3) fw/R5,7 | 0.012 | 0.061 | 0.066 | 0.068 |
| (4) $\frac{N5,1 + N5,3 + N5,5 + N5,6}{4}$ | 1.609 | 1.609 | 1.609 | 1.609 |
| (5) R5,1/R5,3 | −1.10 | −1.09 | −1.12 | −1.28 |
| (6) R5,5/fw | 2.27 | 2.30 | 2.33 | 2.35 |
| (7) R5,8/fw | 1.37 | 1.35 | 1.42 | 1.45 |
| (8) R5,9/R5,11 | 3.05 | 2.41 | 2.07 | 4.53 |
| (9) D5,2/fw | 0.18 | 0.19 | 0.14 | 0.18 |
| (10) D5,6/fw | 1.09 | 1.13 | 1.18 | 1.14 |
| (11) D5,8/fw | 0.15 | 0.14 | 0.11 | 0.16 |

What is claimed is:

1. A zoom lens comprising, from an object side to an image plane side, a first lens unit of positive refractive power for focusing, a second lens unit of negative refractive power having an image magnification varying function, a third lens unit of negative refractive power for compensating for the image shift resulting from variation of the image magnification, a fourth lens unit of positive refractive power for making a light beam from said third lens unit to be an almost divergent light beam, and a fifth lens unit having an image forming function, said fifth lens unit including, from the object side of the image plane side, a first lens of which both lens surfaces are convex, a negative second lens having a concave surface facing the object side, a positive third lens which has a strong refracting surface facing the object side and of which both lens surfaces are convex, a negative fourth lens having a concave surface facing the image plane side, a fifth lens which has a strong refracting surface facing the image plane side and of which both lens surfaces are convex, and a positive sixth lens having a strong refractive surface directed toward the object side, and said zoom lens satisfying the following conditions:

$$1.05 < f4/L < 1.3$$

$$20.4 < |R5,4/fw| < 30.6$$

$$0 < fw/R5,7 < 0.076$$

$$1.58 < (N5,1+N5,3+N5,5+N5,6)/4 < 1.85$$

where L is a distance from a convergent point of an on-axial light beam having passed through said first to third lens units to a front principal point of said fourth lens unit, f4 is a focal length of said fourth lens unit, N5,i is a refractive index of a medium of the i-th lens in said fifth lens unit, R5, i is a radius of curvature of the i-th lens surface in said fifth lens unit, and fw is the shortest focal length of the entire lens system.

2. A zoom lens according to claim 1, further satisfying the following conditions:

$$-1.35 < R5,1/R5,3 < -1.03$$

$$2.14 < R5,5/fw < 2.47$$

$$1.28 < R5,8/fw < 1.53$$

$$1.96 < R5,9/R5,11 < 4.76$$

$$0.13 < D5,2/fw < 0.20$$

$$1.02 < D5,6/fw < 1.24$$

$$0.10 < D5,8/fw < 0.17$$

where D5,i is the i-th axial thickness or air separation in said fifth lens unit.

* * * * *

UNITED STATES PATENT AND TRADEMARK OFFICE
CERTIFICATE OF CORRECTION

PATENT NO. : 4,988,174
DATED : January 29, 1991
INVENTOR(S) : AKIHISA HORIUCHI, ET AL.

It is certified that error appears in the above-identified patent and that said Letters Patent is hereby corrected as shown below:

Cover Page: In Abstract [57]

Line 20, "$1.58<(N5,1+N5,3+N5,5+N5,6)/4<1.86$" should read --$1.58<(N5,1+N5,3+N5,5+N5,6)/4<1.85$--.

Column 3

Line 38, "the that" should --the--.

Column 4

Line 32, "produce" should read --occur--.

Line 49, "exceeds" should read --is exceeded,--.

Line 50, "produced" should read --produced.--

Column 10

Line 20, "$1.58<(N5,1+N5,3+N5,5+N5.6)/4<1.85$" should read --$1.58<(N5,1+N5,3+N5,5+N5,6)/4<1.85$--.

Signed and Sealed this

Eighteenth Day of August, 1992

Attest:

DOUGLAS B. COMER

Attesting Officer     Acting Commissioner of Patents and Trademarks